(12) United States Patent
Malmquist et al.

(10) Patent No.: US 11,280,048 B2
(45) Date of Patent: Mar. 22, 2022

(54) FABRIC

(71) Applicant: VOITH PATENT GMBH, Heidenheim (DE)

(72) Inventors: Johan Malmquist, Katrineholm (SE); Robert Eberhardt, Ellwangen (DE); Susanne Klaschka, Cologne (DE); Torsten Wich, Appleton, WI (US)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/649,429

(22) PCT Filed: Sep. 25, 2018

(86) PCT No.: PCT/EP2018/075894
§ 371 (c)(1),
(2) Date: Mar. 20, 2020

(87) PCT Pub. No.: WO2019/063518
PCT Pub. Date: Apr. 4, 2019

(65) Prior Publication Data
US 2020/0283956 A1 Sep. 10, 2020

Related U.S. Application Data

(60) Provisional application No. 62/563,723, filed on Sep. 27, 2017.

(51) Int. Cl.
*D21F 7/10* (2006.01)
*D21F 1/00* (2006.01)
*B29C 65/16* (2006.01)
*B29K 507/04* (2006.01)
*B29L 31/00* (2006.01)

(52) U.S. Cl.
CPC .............. *D21F 1/0054* (2013.01); *D21F 7/10* (2013.01); *B29C 65/1635* (2013.01); *B29K 2507/04* (2013.01); *B29L 2031/709* (2013.01)

(58) Field of Classification Search
None
See application file for complete search history.

(56) References Cited

U.S. PATENT DOCUMENTS 6,450,213 B1 * 9/2002 Gauthier ............... D21F 1/0054
139/383 AA
7,381,307 B2 6/2008 Silakoski
9,714,483 B2 7/2017 Straub et al.
(Continued)

FOREIGN PATENT DOCUMENTS

DE 102011004658 A1 8/2012
DE 202012100695 U1 3/2013
(Continued)

*Primary Examiner* — Alexander S Thomas
(74) *Attorney, Agent, or Firm* — Laurence A. Greenberg; Werner H. Stemer; Ralph E. Locher

(57) ABSTRACT

A fabric clothing, in particular a press felt, for use in a machine for producing a fibrous web, contains a woven fabric strip having interwoven longitudinal threads and cross threads, as well as having a first and a second longitudinal end. The two longitudinal ends of the woven fabric strip are connected to one another in a connection zone. Provision is made that the two longitudinal ends are welded to one another by a transmission welding, in particular by a laser transmission welding.

16 Claims, 12 Drawing Sheets

(56) References Cited

U.S. PATENT DOCUMENTS

| | | |
|---|---|---|
| 2007/0028997 A1 | 2/2007 | Best et al. |
| 2013/0333792 A1 | 12/2013 | Eberhardt et al. |
| 2014/0186579 A1 | 7/2014 | Botelho et al. |
| 2015/0096704 A1* | 4/2015 | Straub ................ B29C 66/8362 162/348 |

FOREIGN PATENT DOCUMENTS

| | | |
|---|---|---|
| DE | 102012207016 A1 | 10/2013 |
| DE | 102014201768 A1 | 5/2015 |

* cited by examiner

FABRIC

BACKGROUND OF THE INVENTION

Field of the Invention

The invention relates to a fabric clothing for use in a machine for producing a fibrous web.

Fabric clothings, in particular fabric clothings for paper machines, as a component part often comprise one or a plurality of woven fabric strips. Continuous woven fabric strips, so-called strip loops, are usually needed for use in a fabric clothing. Said strip loops can either be woven directly as a strip loop, or be woven as a flat fabric which is rendered continuous by connecting the two longitudinal ends.

Various possibilities for such a connection of two ends of a woven fabric strip are known from the prior art.

US 2014/0186579 thus describes the connecting of two ends by means of an ultrasonically welded seam.

However, this type of connection is disadvantageous. As can also be seen in the figures of US 2014/0186579, the woven fabric suffers in the welding process, on the one hand. The properties of the joint after the welding cannot be readily predicted. The strength properties of the welded filaments also suffer. This is particularly disadvantageous since a sufficient tensile strength, in particular in the machine direction, represents an important quality features of the woven base fabric as well as of the finished fabric clothing.

Finally, welded connections of this type are also comparatively fragile.

A welded connection of two woven fabric ends is also proposed in U.S. Pat. No. 7,381,307. U.S. Pat. No. 7,381,307 does not go into great detail in terms of the welding of the ends but in general proposes laser welding as a suitable type of connection.

Whilst it is in principle possible for some of the disadvantages of ultrasonic welding to be avoided by laser welding, any arbitrary laser welding method cannot be successfully used in such a connection.

It has to be ensured, on the one hand, that the strength of the welded threads is not excessively reduced on account of the welding. The heat created during the laser welding reduces the strength of the threads, should the latter be excessively heated.

Nevertheless, it has to of course be ensured that the joint has the required strength.

Moreover, the joint should not be too complex to produce since this increases the complexity in terms of the production of the fabric clothing.

These tasks are mutually exclusive to some extent.

SUMMARY OF THE INVENTION

It is an object of the present invention to improve the fabric clothings known from the prior art, in particular in terms of the joints thereof.

It is a further object of the present invention to propose a fabric clothing having a joint in which the properties of the joint, or of the connection, are able to be predicted or set, respectively, already prior to joining.

It is furthermore an object of the invention, to propose a fabric clothing having a joint or connection, respectively, in which the connection has sufficient strength. It is moreover a further object of the invention that the welded filaments, in particular those filaments disposed in the machine longitudinal direction, have sufficient strength also after the joining.

It is a further object to be achieved by the invention to propose a fabric clothing having a joint, wherein the connection is easy to produce.

These objects are fully achieved by a fabric clothing, which is disclosed herein, for a machine for producing a fibrous web.

Proposed is a fabric clothing, in particular a press felt, for use in a machine for producing a fibrous web. The fabric clothing comprises a woven fabric strip having interwoven longitudinal threads and cross threads, as well as having a first and a second longitudinal end, wherein the two longitudinal ends of the woven fabric strip are connected to one another in a connection zone. It is provided according to the invention herein that the two longitudinal ends are welded to one another by means of transmission welding, in particular by means of laser transmission welding.

Laser transmission welding is also referred to as laser beam welding.

The transparent mating partner herein is penetrated by the laser beam without being appreciably heated. The laser beam is absorbed in a surface-proximal layer only in the second mating partner, wherein the laser energy is converted to thermal energy and the plastics material is fused. The transparent mating partner is then also heated on the surface by way of thermal conduction.

However, the invention is not limited to laser transmission welding. It is thus also conceivable in principle that another source instead of a laser is used for generating the light beam.

A mating partner hereunder is to be referred to as "absorbent" or "largely absorbent" to light of a wave length range when said mating partner absorbs more than 50%, in particular more than 80% of the light introduced thereinto.

A mating partner hereunder is to be referred to as "transparent" or "largely transparent" to light of a wavelength range when more than 50%, in particular more than 80%, of the light introduced into said mating partner penetrates the latter.

Advantageous embodiments of the invention are described in the dependent claims.

The most varied types of woven fabrics can be used as the woven fabric strip. These herein can in particular be a single-layered, two-layered, or else a multi-layered woven fabric.

It can also be advantageously provided that the fabric clothing comprises more than one woven fabric strip, for example a second or a third woven fabric strip.

The ends of the further woven fabric strips herein can be connected in a manner analogous to that of the first woven fabric strip by means of transmission welding. Some or all of the further woven fabric strips can however also have other connecting structures. In particular, one or a plurality of the further woven fabric strips can be a continuous woven fabric or continuous woven fabrics, respectively.

In one advantageous embodiment of the invention, at least one connection element which by means of transmission welding, in particular by means of laser transmission welding, is connected to at least some of the longitudinal threads of at least one longitudinal end, in particular both longitudinal ends, can be provided.

Said connection element, or said connection elements, respectively, can be connected to the woven fabric strip only by way of the welded connection. However, said connection element, or said connection elements, respectively, also can be additionally connected to the woven fabric strip by weaving, stitching, or similar methods. It can thus be provided for example, that one connection element or a plurality of connection elements is/are woven and welded by way of one longitudinal end, while said connection element/connection elements is/are only welded by way of the other longitudinal end.

In one very preferable embodiment, the fabric clothing can comprise a woven fabric strip having a first and a second longitudinal end and at least one connection element, wherein the two longitudinal ends of the woven fabric strip are connected to one another in a connection zone by means of the at least one connection element.

It can be provided herein that the connection zone is configured in such a manner that one or a plurality of cross threads, while configuring free ends of the longitudinal threads, are removed on at least one longitudinal end, in particular both longitudinal ends, of the woven fabric strip.

The at least one connection element by means of transmission welding, in particular laser transmission welding, can furthermore be welded to at least some of the free ends of both longitudinal ends. The force transmission between the two longitudinal ends herein takes place only by way of the connection element, or connection elements, respectively.

It can be provided in particular that the free ends of the longitudinal threads are not directly welded to one another in such an embodiment. The free ends in this instance are welded to only one or a plurality of connection elements.

It can advantageously be provided that the free ends have been created by removing one, two, three, four, five, or more, cross threads, in particular 10 or more cross threads.

In particularly advantageous embodiments it can be provided that the at least one connection element, in particular all connection elements, comprises/comprise, or is/are composed of, at least one thread or a tape, which is oriented substantially in the cross direction of the woven fabric strip.

All known types of threads can be used herein, such as, for example, monofilament, thus yarns from a single filament, or else multifilaments. Said threads can be twisted as single-ply or two-ply threads.

It can be provided herein, for example, that the at least one connection element, or all connection elements, respectively, is/are composed of a thread which in terms of substantial properties such as, for example, diameter and/or flexural rigidity, corresponds to the remaining cross threads of the woven fabric strip.

The connection element, for example the thread, can in particular be largely composed of the same material, in particular the same polymer material, as the remaining cross threads. The term "largely" herein is intended to to permit the possibility that additives such as, for example dyes, can be mixed with the material of the connection element, said additives however accounting for less than 30% by weight, in particular less than 10% by weight.

A tape can be, for example, a tape having a width of less than 50 mm, 30 mm, 20 mm, 10 mm, or 5 mm.

This can preferably be a textile tape, in particular a woven fabric tape, a film with or without a perforation, a polymer matrix with or without reinforcement elements. Alternatively however, other types of tapes are also possible.

Furthermore, more than one connection element, in particular two, three, or more, connection elements can advantageously be provided.

Since the force transmission between the two longitudinal ends takes place exclusively by way of the connection elements, the strength of the connection can be increased by additional connection elements.

In further preferred embodiments it can be provided that fewer than 10 connection elements, in particular 5 connection elements or fewer, are provided. The complexity in the production by means of transmission welding is reduced on account of a lower number of connection elements.

It is very particularly advantageous for the number and/or the positioning of the connection elements to be chosen such that the welding can be accomplished in a single welding procedure. This is possible in particular when the number of connection elements is not excessive, in particular is less than 10.

The great advantage when using transmission welding lies in that the materials of the woven fabric strip as well as of the connection element, or connection elements, respectively, can be adapted to one another and to the light used, or to the laser used, respectively. The materials can in particular be chosen such that at least the longitudinal threads of the woven fabric strip are largely transparent to the (laser) light used, while the connection element or the connection elements fully absorb the (laser) light, or at least to the extent of 50%, in particular to the extent of at least 80%.

This has the great advantage that the connection elements are mainly heated on account of the absorption of the light when welding, while the longitudinal threads are not fully heated when welding but are connected only on that surface by way of which said longitudinal threads are in contact with the connection elements, or are connected to the latter, respectively. Damaging the strength properties of the longitudinal threads is largely avoided on account thereof. Potential damage to the connection elements on account of heating is less critical. Should the overall strength of the connection, or of the entire fabric clothing, respectively, on account thereof be reduced to below a tolerance threshold, this can be addressed in a simple manner by adding a further connection element.

The use of transmission welding in the fabric clothing can be verified by way of the described effect, specifically that the material of the transparent threads, thus usually of the longitudinal threads, has not been fully heated when welding.

It can be provided in specific advantageous embodiments of the fabric clothing that the connection elements are woven or stitched to the free ends of some longitudinal threads. It can be provided herein that the connection element is also welded to the free ends to which said connection element is woven or stitched. It can alternatively be provided that the connection element is woven or stitched only to such longitudinal threads to which said connection element is not welded.

It can be possible for the strength of the connection to be further increased by said weaving or stitching.

It can be provided herein either that the connection elements have been conjointly interwoven already in the production process of the woven fabric strip. This can be advantageous inter alia when the connection elements are threads.

In other embodiments it can be provided that the connection element has been subsequently woven or stitched to free ends of the longitudinal threads. This can be advantageous, for example, when tapes are used as connection elements.

Both types can also be combined with one another.

In other particularly preferred embodiments it can furthermore be provided that the connection elements are connected to the woven fabric strip in general, or to the longitudinal threads in particular, only by way of the welded connection. It can in particular be provided that the connection elements are not woven or stitched to the longitudinal threads. The connection elements can particularly advantageously only be placed onto the longitudinal threads, or the free ends of the longitudinal threads, respectively, and be welded to all or some of the latter.

A connection of this type is in particular advantageous because the connection of the longitudinal ends can take place very rapidly. The complexity for weaving or stitching the connection elements herein is comparatively high.

It can be provided herein that connection elements are disposed on an upper side as well as on a lower side of the connection zone, or that all connection elements are disposed on one side of the connection zone.

The connection can be produced in a very simple manner when all connection elements are disposed on one side of the connection zone. A disposal of the connection elements on the upper side and the lower side can enhance the uniformity of the connection zone in specific applications.

In further very advantageous embodiments of the fabric clothing it can be provided that the free ends of the longitudinal threads engage in one another in the region of the connection zone.

It can in particular also be provided that the free ends of the longitudinal threads of one or both longitudinal ends are of dissimilar lengths.

The density of the longitudinal threads in the connection zone can be reduced in this way, and a simple connection of the longitudinal ends can nevertheless still be achieved.

Specifically, if all free ends on both sides are of identical length, and said ends engage in one another in the connection zone, the connection zone at least in regions thus has double the number of longitudinal threads per unit length, thus double the longitudinal threads density, as compared with a woven fabric region outside the connection zone. A particularly high strength of the connection can be achieved by way of this embodiment. However, the connection region in embodiments of this type in terms of other properties, for example the permeability to air and/or water, for example, will often significantly differ from the regions outside the connection zone.

The longitudinal thread density in the connection zone herein can advantageously be between the longitudinal thread density outside the connection zone and the double longitudinal thread density outside the connection zone. Alternatively, it can also be provided that the longitudinal thread density in the connection zone is below the longitudinal thread density in the remaining fabric clothing, for example is 90%.

It can particularly advantageously be provided that the density of the longitudinal threads in the connection zone is the same as outside the connection zone. Alternatively, the density of the longitudinal threads in the connection zone can also differ from the density of the longitudinal threads outside the connection zone by up to 10%, 25%, 30%, 50%, 75%, or even more.

This can be implemented, for example, such that each second free end of the longitudinal threads is removed, or at least partially removed, at both longitudinal ends such that gaps are created. The longitudinal ends in this instance can be disposed such that the remaining free ends of the one side are positioned in the gaps of the other side. A disposal of this type is to be set forth as only one example of many possibilities of rendering the longitudinal thread density in the connection zone to the same density as outside the connection zone by way of free ends of dissimilar length. The person skilled in the art will readily find a multiplicity of potential combinations of lengths and positionings of the free ends which achieve the same effect. For example, the free ends herein can also have three, four, or more, dissimilar lengths instead of only two, as described in the example. Thinning the free ends in such a manner facilitates the advantageous property of the invention that the properties of the connection are able to be predicted or set, respectively, already prior to the joining.

It is a further advantage that the extent of the connection zone can also be adapted in the longitudinal direction of the fabric clothing. It can thus be established in the design of the fabric clothing, for example, whether a wide connection zone of, for example, 5 mm or more, in particular 10 mm, 20 mm, or 30 mm is provided. In this case, properties of the connection zone such as the permeability or the thickness can be largely matched with properties outside the connection zone by reducing the longitudinal thread thickness, for example, such that said properties are in particular in the range between 80% and 120% of the corresponding values outside the connection zone.

The required strength of the connection in this instance can be guaranteed, for example, by way of the width of the connection.

Alternatively however, a narrow connection zone having the extent of less than 5 mm, for example 3 mm or 2 mm, can also be provided. Comparatively large deviations in terms of the permeability or of similar properties can often also be tolerated in a narrow connection zone of this type. In this case, for example the permeability of the connection zone can thus deviate from the permeability of the remaining woven fabric strip by more than 30%, 50%, or else by more than 100%. In order for the required strength to be guaranteed, it can therefore be advantageous here for a higher longitudinal thread density, for example double the longitudinal thread density, to be provided in the connection zone in comparison with a region outside the connection zone.

In one further advantageous embodiment it can be provided that at least one connection element contacts or is welded to only part of the longitudinal threads, in particular fewer than 75%, or fewer than 50%, of the longitudinal threads of each longitudinal end.

It can furthermore be provided in the fabric clothing that at least one connection element, preferably all connection elements, at least on one surface comprises/comprise a material which absorbs light from a wavelength range between 780 nm and 1100 nm, in particular between 800 nm and 1000 nm.

The use of an absorbent material of this type is advantageous because almost all non-reinforced thermoplastics of natural color have a high transmission rate in said wavelength range. On account thereof, these materials are therefore highly suitable as transparent mating partners. However, in order for a material such as, for example, polyamide, polyethylene, or similar, to be able to be used as an absorbent mating partner in transmission welding, the addition of a corresponding absorber material is advantageous.

A suitable absorber material can be, for example, carbon black, or else graphite. However, other suitable absorber materials are also known to the person skilled in the art. The absorbent material herein can be applied to the surface of the connection element, for example, or be incorporated in the surface, or in the entire mass, respectively, of the connection element.

In one further advantageous embodiment it can be provided that one or a plurality of absorbent cross threads which are welded to at least some of the longitudinal threads are woven into the woven fabric strip.

Absorbent cross threads are to be understood to be cross threads which at least on the surface comprise a material which to the extent of at least 50%, advantageously to the extent of at least 80%, ideally completely, absorbs light from a wavelength range between 780 nm and 1100 nm, in particular between 800 nm and 1000 nm.

Said absorbent cross threads differ from a connection element also in that said cross threads contact, or are welded to, respectively, only longitudinal threads of one longitudinal end. The absorbent cross threads are disposed outside the connection zone. When viewed in the longitudinal direction of the woven fabric strip, at least some of said absorbent cross threads can advantageously however be directly adjacent to the connection zone, or have a spacing of a few millimeters, usually less than 100 mm, or else less than 20 mm, from the connection zone, respectively.

Said absorbent cross threads can particularly preferably absorb light of the same wavelength as one or a plurality of the connection elements.

The absorbent cross threads can be welded to all or some of the longitudinal threads, preferably by way of the same welding method as the connection elements. Said absorbent cross threads serve for preventing ladders in the woven fabric strip, for example. Should a defect arise in the region of the connection zone, said defect should not spread across the entire woven fabric strip. It is therefore advantageous for said absorbent cross threads to be provided in the proximity of the connection zone, especially as first cross threads, or within the first 5 or 10 cross threads after the connection zone, respectively. Alternatively and/or additionally, welded threads can also be provided in, or woven into, other locations of the woven fabric strip.

When using transmission welding, it is also advantageous for two or more neighboring cross threads to be provided as absorbent cross threads. Depending on the weave pattern used, it can thus be ensured that each of the (transparent) longitudinal threads runs once across the absorbent cross thread, this enabling transmission welding from one side of the fabric clothing.

It can be provided in one very advantageous embodiment that the strength of the welded longitudinal threads is at least 60%, in particular at least 75%, of the strength of the non-welded longitudinal threads. It can be particularly advantageous for the strength of the welded longitudinal threads to be at least 80%, 85%, 90%, or 95%, of the strength of the non-welded longitudinal threads.

A plurality of methods can be used for determining the strength of the longitudinal threads:

1) Comparison of tensile strengths: Two parts of identical length are removed from a longitudinal thread of the fabric clothing. One part from a longitudinal end of the woven fabric strip where the thread has been welded to the at least one connection element, and another part from a remote end which does not have any welded locations. The tensile strength is determined for both parts (see to this end ASTM D 638 Standard Test Method for Tensile Properties of Plastic) and the values obtained are compared with one another.

1b) This measurement can take place after the welding, on the woven fabric strip that has not yet been further processed.

1b) This measurement can alternatively also take place on longitudinal threads of a finished fabric clothing, and thus after any potential needle bonding to one or a plurality of non-woven layers.

2) Force measurement at constant elongation: As described under 1), two parts of a longitudinal thread are examined and compared with one another here too. One force/elongation diagram is in each case established for both parts. The force at which the thread part has been elongated by 2% is determined herein. Said force values for both parts are compared with one another.

2a) This measurement can take place after the welding, on the woven fabric strip that has not yet been further processed.

2b) This measurement can alternatively also take place on longitudinal threads of a finished fabric clothing, and thus after any potential needle bonding to one or a plurality of non-woven layers.

The criterion that the strength of the welded longitudinal threads is to be at least 75% of the tensile strength of the non-welded longitudinal threads should be met when the value of the welded longitudinal thread for at least one of the measured values described under 1a), 1b), 2a) and 2b) is at least 75% of that of the non-welded part.

On account of the transmission welding, in particular the laser transmission welding, used it can be achieved that damage to the longitudinal threads at the welding location on account of the welding method is very minor. In particular, when the longitudinal threads are chosen as the transparent mating partner, which is generally very advantageous. In this case, the longitudinal threads when welding are heated on the surface, if at all. Heating of the interior of the longitudinal threads, and thus a potential weakening of the material structure, is largely avoided herein. The crystalline structure and the orientation of the molecular chains of the transparent mating partner are also largely preserved. Even the geometry of the longitudinal threads can be largely preserved.

Experiments of the applicant have demonstrated that the material structure in the technique of ultrasonic welding known from the prior art is heavily damaged in such a manner that the strength of the longitudinal threads after the welding is usually less than one third of the strength in the non-welded state. In particular, the longitudinal threads become very fragile on account of this welding method.

In one further very advantageous embodiment it can be provided the strength of the connection zone is at least 25%, in particular at least 50%, of the strength of the strength of the remaining woven fabric strip.

The strength of the connection zone herein is compared with the strength of the remaining woven fabric strip by a method which is analogous to that as has been used for determining the strength of the longitudinal threads. A piece of a woven fabric strip which comprises a connection zone is used herein, and said piece is compared with a piece from the same woven fabric strip which does not comprise any connection zone.

The strength of the connection zone and the strength of herein are quite dissimilar properties.

Only the material properties and the geometry of the thread largely play a role in the strength of a longitudinal thread. Apart from the strength of the longitudinal threads, the strength of the connection elements as well as the strength of the joint play inter alia a role in the strength of the connection zone. In the fabric clothings known from the prior art, such as in ultrasonically-welded fabric clothings, for example, an increase in the strength of the joint is associated with a reduction in the strength of the longitudinal threads. Moreover, the connections rapidly become fragile. In a fabric clothing according to a preferred embodiment of the present invention, this can be avoided and a strong joint in which the longitudinal threads largely maintain the strength thereof can be achieved in particular by using laser transmission welding. The connection is moreover also not as fragile as is the case with ultrasonic welding.

In further advantageous embodiments it can be provided that the properties of the connection zone correspond largely to those of the remaining woven fabric strip.

For example, the connection zone can have a permeability which differs from the permeability of the remaining woven fabric strip by less than 30%, less than 20%, or less than 10%.

Alternatively or additionally, the connection zone can have a thickness which differs from the thickness of the remaining woven fabric strip by less than 10%.

In other advantageous embodiments, the connection zone can have a permeability which differs from the permeability of the remaining woven fabric strip by more than 10%, more than 30%, or than 50%. This can be particularly advantageous when the connection zone has a width of less than 5 mm, in particular 3 mm or 2 mm.

In many applications, even relatively large local variations of this type, due to the small size of the connection zone, no longer influence the properties of the finished fabric clothings, or influence the latter only to a very minor extent.

It is moreover also possible that the properties of the connection zone can also be influenced by a suitable choice of the connection element or connection elements, respectively.

It can thus be provided, for example, that the connection elements are embodied in the form of threads, and said threads in terms of the diameter and the thread density correspond to the cross threads of the woven fabric strip, or deviate therefrom by less than 10%.

In other embodiments, the number of said cross threads, thus the cross thread density, in the connection zone, can however also be increased or reduced.

Alternatively or additionally, the diameter of said threads can also be chosen so as to be larger or smaller than the diameter of the cross threads outside the connection zone.

In one embodiment of the fabric clothing, at least one cross thread outside the connection zone, in particular a first cross thread outside the connection zone, can be interwoven with as well as welded to the longitudinal threads. Such a woven fabric thread in this instance is then connected only with longitudinal threads of one longitudinal end of the woven fabric strip. Said woven fabric thread thus does not primarily contribute toward the strength of the connection. The main advantage of such a welded cross thread lies in that said cross thread in the case of damage in the connection zone prevents that the damage extends through the entire fabric clothing and a ladder is formed, for example. Said cross threads can advantageously be configured such that said cross threads can also be welded, or are welded, respectively, to the longitudinal threads by means of transmission welding.

The fabric clothing can preferably be a press felt. The fabric clothing particularly preferably comprises one or a plurality of layers of non-woven material. Said non-woven material can be connected to the woven fabric by needle bonding.

However, the fabric clothing can also be a forming screen, a drying screen, or a transfer belt, or any other fabric clothing which is suitable for use in a machine for producing a fibrous web.

It can be provided that the strip loop, which is created by rendering the woven fabric strip continuous, is fitted to the machine directly and used as a strip loop, optionally after needle bonding to one or a plurality of non-woven layers, or after applying other suitable functional layers, respectively. In such an embodiment, the connection zone represents a type of seam of the fabric clothing.

Alternatively, it can however be provided that the strip loop is used in a seam felt, for example. It can be provided in this case that the length of the woven fabric strip corresponds to approximately double the length of the later fabric clothing. A double-layered formation which has two fold locations is created by depositing the woven fabric loop on top of itself. The connection zone is advantageously placed such that said connection zone has a specific spacing, for example at least 5 cm or at least 10 cm, from the locations of the folds. This double-layered formation can in itself, or optionally conjointly with further layers, in particular woven fabric layers, form the base structure for a felt. Said base structure can usually be provided with yet one more non-woven layer or a plurality of non-woven layers which are needle bonded to the base structure, for example. In the case of a fabric clothing of this type, seam loops can be formed from the two fold locations. To this end, a few cross threads are usually removed in the region of the fold locations. A few cross threads can optionally also be displaced. Said seam loops are brought together. The fabric clothing can be rendered continuous by being connected by means of a so-called pintle.

Depending on how the folding of the woven fabric strip takes place, the seam loops can either stand so as to be vertical, thus run in one plane with the thickness direction and the longitudinal direction of the fabric clothing.

Said seam loops can however also stand so as to be inclined and enclose an angle with said planes. This can be implemented, for example, in that the longitudinal threads are not deposited exactly on top of one another when folding.

In such a seam felt, the connection zone thus does not represent a seam of the fabric clothing. Reference here is made to a so-called "join".

In order for a reliable operation to be guaranteed, fabric clothings are often tensioned in the use of the latter. On account thereof, said fabric clothings are exposed to tensile stress. This tensile stress can even be increased in that the fabric clothing in operation is pulled across stationary elements.

In particular press felts are exposed to high tensile stresses when in operation in paper machines. In advantageous embodiments of the invention it can therefore be provided that the fabric clothing, especially the press felt, has a maximum tensile force of more than 25 kN/m, in particular more than 30 kN/m, preferably more than 35 kN/m, in particular more than 40 kN/m. The connection zone, thus the seam, or the join, respectively, herein is often a weak spot. By way of the connection by means of transmission welding according to one of the aspects of this invention, fabric clothings which in operation withstand the tensile stresses permanently, that is to say during the service life of the fabric clothing, can also be produced in a simple manner.

The service life of a fabric clothing can usually be between one week and six weeks, especially between three and four weeks.

EXAMPLES

Some potential implementations of the connection according to one aspect of the invention will be described in a more detailed and exemplary manner hereunder. However, the invention is not limited to the parameter ranges stated.

In order for the welded connection to be established, a laser with roller optics, which by way of a specific joining pressure was pressed onto the woven fabric and the connection elements, was used in the example.

Threads which had been dyed with carbon black were used as the connection element.

Further details included:

|  | Example 1 | Example 2 | Advantageous |
| --- | --- | --- | --- |
| Wavelength (laser) | 840 nm | 840 nm | 780 nm-1100 nm |
| Diameter roller optics | 15 mm | 15 mm | 10 mm-20 mm |
| Width roller optics | 30 mm | 30 mm | 10 mm-50 mm |
| Joining force | 20 N | 5 N | 2 N-100 N |
| Laser output | 150 W | 200 W | 50 W-300 W, in particular 100 W-200 W |

Table 1: Examples

DETAILED DESCRIPTION OF THE INVENTION

Figure 1A:
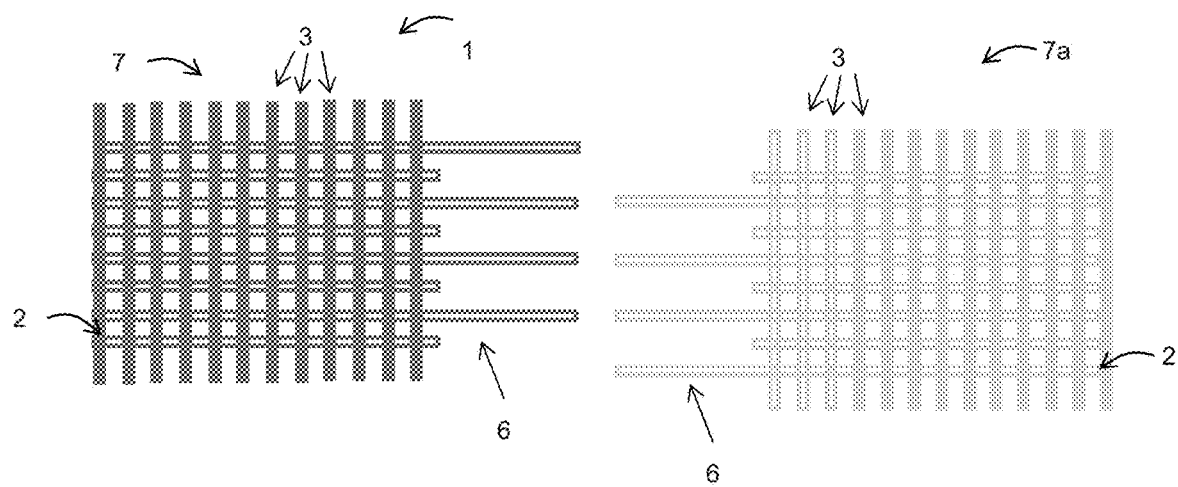
FIGS. 1a and 1b show the connection of two longitudinal ends according to one aspect of the invention.

FIG. 1a shows the two longitudinal ends 7, 7a of a woven fabric strip 1. The woven fabric strip 1 herein is formed from longitudinal threads 2 and cross threads 3. Free ends 6 of the longitudinal threads 2 are provided at both longitudinal ends 7, 7a by removing some cross threads 3.

The length of said free ends in the embodiments shown in FIG. 1a comprises five cross threads. However, free ends 6 which are longer or shorter can also be provided. In the embodiment shown in FIG. 1a, the free ends 6 of the longitudinal threads 2 on each longitudinal end 7, 7a are of dissimilar lengths. The free end 6 herein has been removed from each second longitudinal thread 2, while the respective other free end 6 has been left at full length.

Figure 1B:
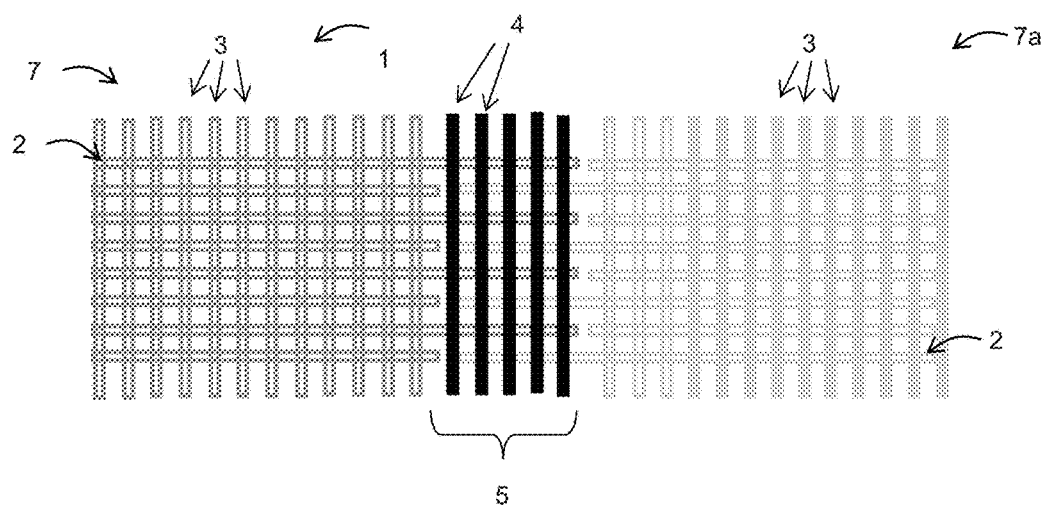

FIG. 1b now shows how said free ends 6 of the longitudinal threads 2 engage one another in the region of the connection zone 5. The thread density of the longitudinal threads 3 in the connection zone 5 here is substantially the same as in the remaining woven fabric strip. A plurality of connection elements 4 in the form of threads 4 which are oriented in the cross direction of the woven fabric strip 1 are provided in the connection zone in FIG. 1b. By way of five threads in FIG. 1b, exactly the same number of connection elements 4 are provided as cross threads 3 have previously been removed. However, this does not necessarily have to be the case. More or fewer connection elements can also be provided. In particularly preferred embodiments, there can be one or two thread-shaped connection elements 4.

It can be seen that the connection elements 4 contact and are welded to only part of the longitudinal threads 3, in this case to half of the longitudinal threads 3 of each longitudinal end 7, 7a.

The connection elements 4 are provided on one side of the woven fabric strip 1 in FIG. 1b. However, said connection elements 4 can also be provided on different sides of the woven fabric strip 1.

The connection elements 4 at least on the surface thereof can comprise a material which absorbs light from a wavelength range between 780 nm and 1100 nm, in particular between 800 nm and 1000 nm.

Each connection element here is connected to free end 6 of both longitudinal ends 7, 7a by means of transmission welding, in particular laser transmission welding. On account thereof, the two longitudinal ends 7, 7a of the woven fabric strip are connected to one another and form an continuous loop. The force transmission herein takes place only by way of the connection elements 4. In advantageous embodiments.

Figure 2A:
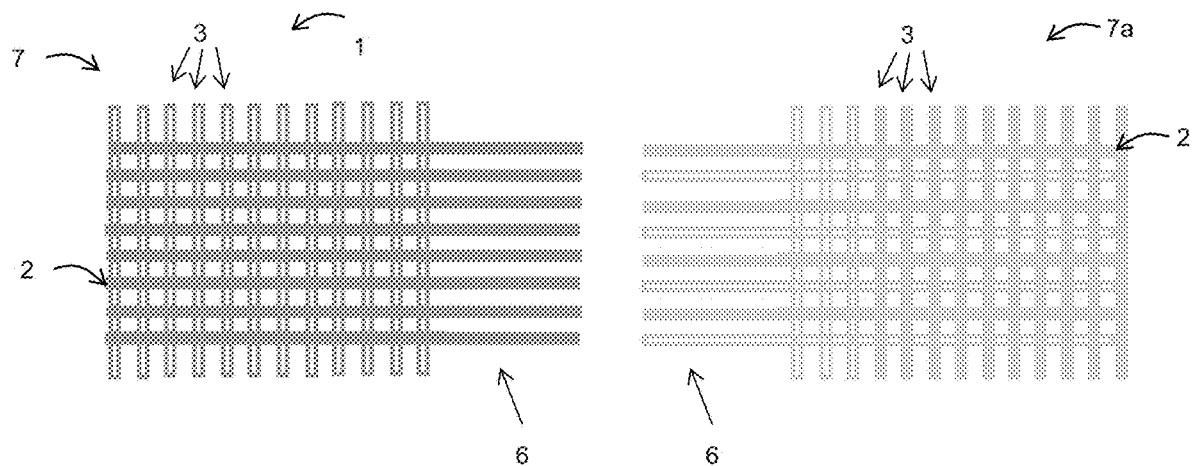
FIGS. 2a and 2b show the connection of two longitudinal ends according to one further aspect of the invention.
Figure 2B:
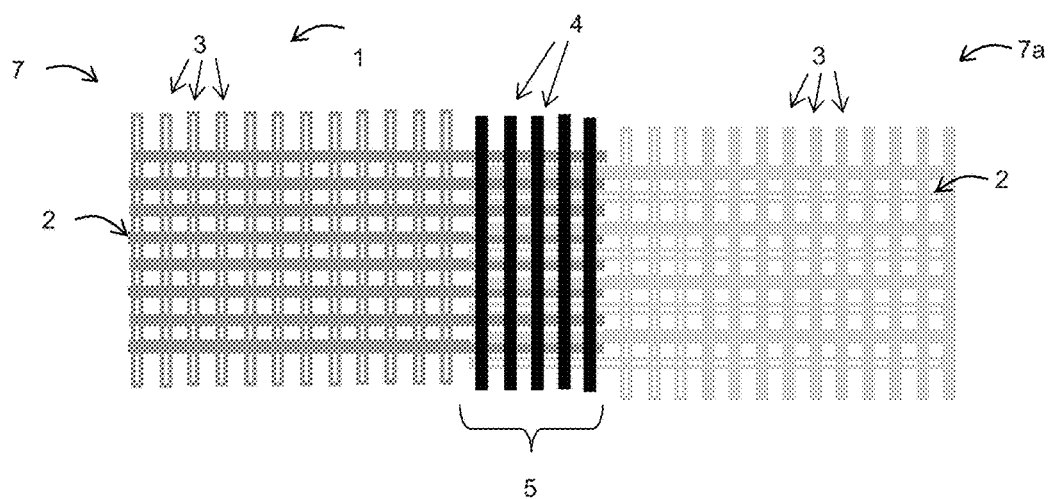

The embodiment of the invention illustrated in FIGS. 2a and 2b differs from the embodiment in FIGS. 1a and 1b only in that none of the free ends 6 has been removed or shortened. All free ends 6 on both longitudinal ends 7, 7a are of identical length. As can be readily seen in FIG. 2b, the thread density of the longitudinal threads 2 in the region of the connection zone 5 is significantly higher than in the remaining woven fabric strip 1, specifically approximately double the latter. The strength of the connection zone 5 can be increased on account of a connection of this type, since the number of contact points between the connection elements 4 and the free ends 6 is increased. However, the permeability of the connection zone will be reduced in comparison to the remaining woven fabric strip on account of the higher thread density.

In many applications it is desirable for the permeability of the connection zone 5 to not deviate by more than 30% from the permeability of the remaining woven fabric strip.

While the connection zone 5 in an embodiment according to FIGS. 1a and 1b has a type of optimum permeability (same thread density as in the remaining woven fabric strip 1), the connection zone 5 in FIGS. 2a and 2b in a certain sense has an optimum strength, however at a very minor permeability. A compromise between strength and permeability which in a certain sense is optimal can be achieved in a simple manner by adapting the lengths of the free ends in a suitable manner.

Figure 3A:
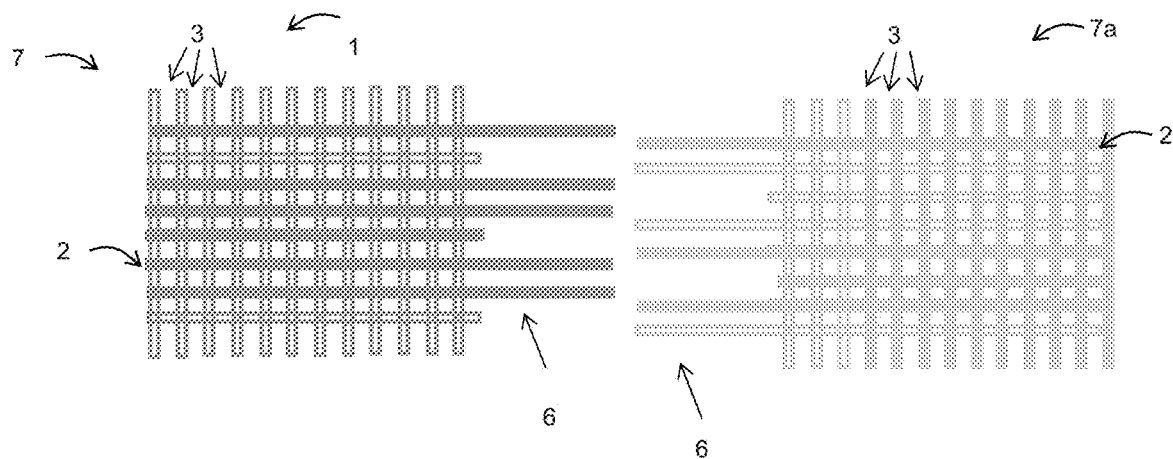
FIGS. 3a and 3b show the connection of two longitudinal ends according to one further aspect of the invention.
Figure 3B:
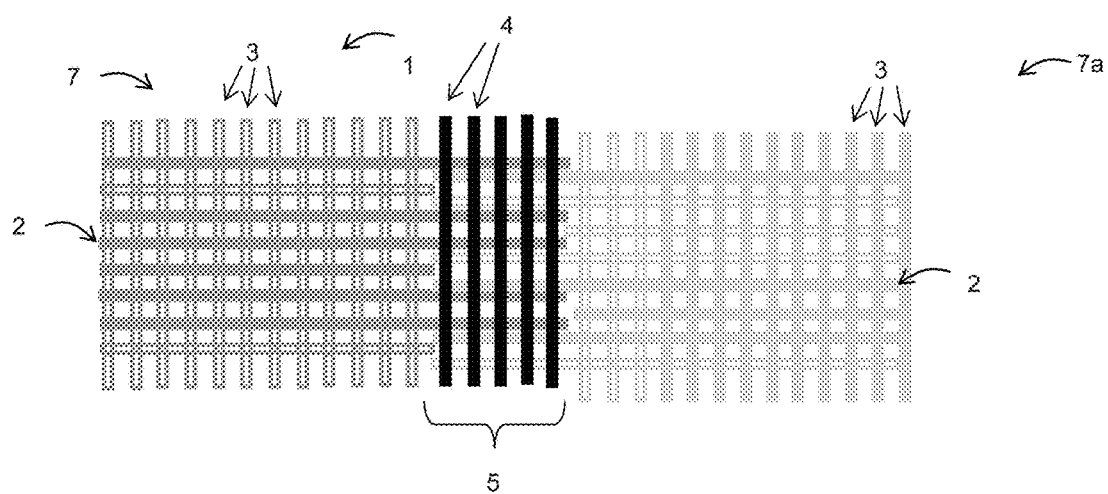

A potentially more suitable compromise is shown in FIGS. 3a and 3b. Here, each third free end 6 of each longitudinal end 7, 7a has been shortened, especially removed. The number of contact points with the connection elements 4, as well as the longitudinal thread density in the connection zone 5, and thus the permeability of the connection zone 5, thus are between those of FIGS. 1a and 1b as well as 2a and 2b. The embodiments shown in FIGS. 1a/b, 2a/b, and 3a/b are intended to indicate in an exemplary manner the manifold possibilities which result on account of free ends being selectively shortened. Proceeding therefrom, the person skilled in the art will readily come to multiplicity of further embodiments in which the longitudinal thread density is between those of the embodiments shown in FIGS. 1*a/b* and FIGS. 2*a/b*, respectively.

Figure 4A:
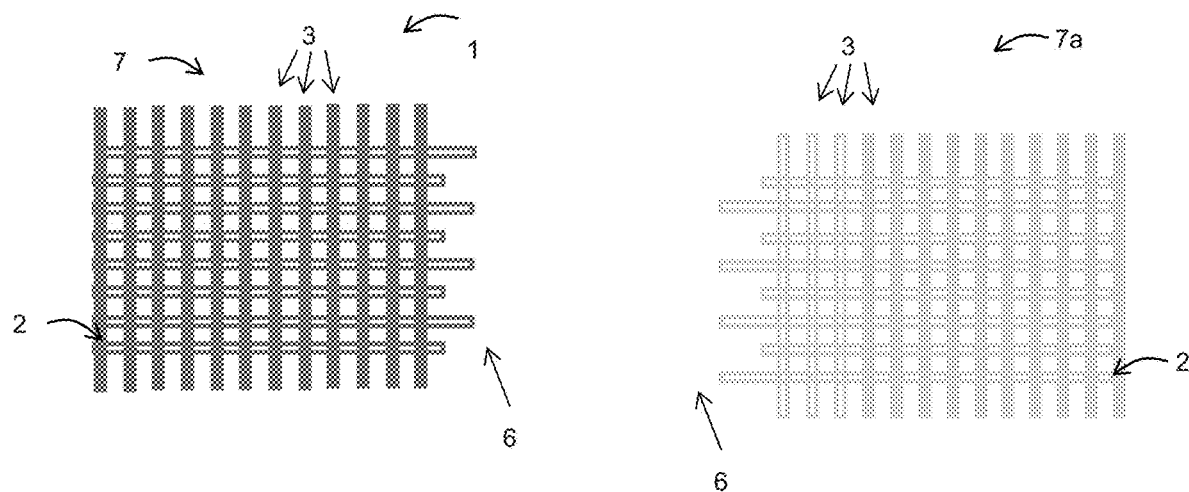
FIGS. 4a and 4b show the connection of two longitudinal ends according to one further aspect of the invention.
Figure 4B:
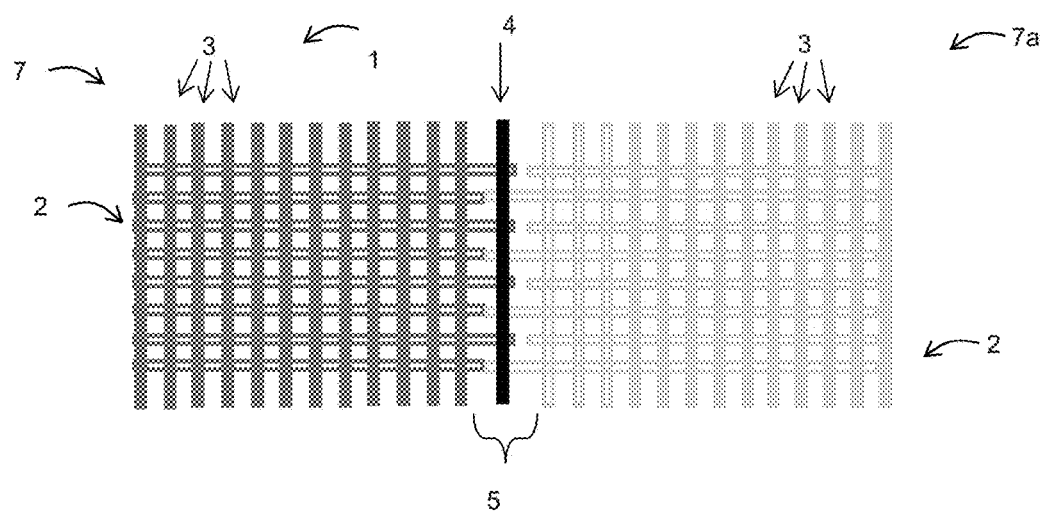

FIGS. 4*a* and 4*b* show a variant of the embodiment shown in FIGS. 1*a* and 1*b*. This variant comprises only a single connection element 4, in particular one thread 4 or one tape 4. Since this herein is a particularly preferred embodiment, this embodiment is to be once again explicitly set forth here.

Figure 5A:
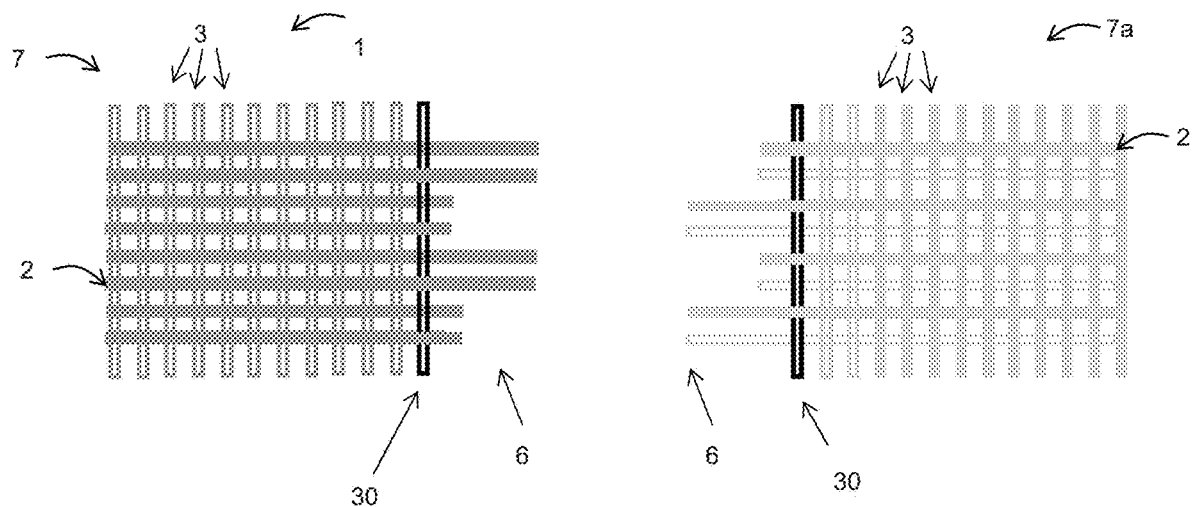
FIGS. 5a and 5b show the connection of two longitudinal ends according to one further aspect of the invention.
Figure 5B:
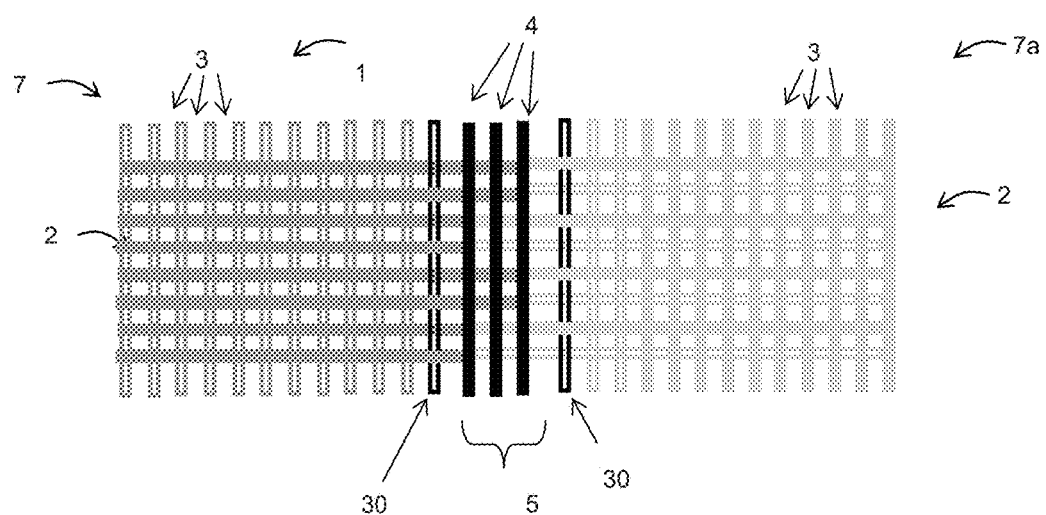

An embodiment in which two neighboring free ends 6 are in each case shortened, while the two neighboring free ends following the former are not shortened, is shown in FIG. 5*a*. The connection thus created has properties which are very similar to those described in FIGS. 1*a* and 1*b*. As can be seen in FIG. 5*b*, the connection zone 5 here is implemented by means of three connection elements 4. When threads 4 are used as connection elements 4, the use of three elements 4 can be advantageous in terms of production technology, since the simultaneous welding of all connection elements in a single operative step is possible by means of a line laser, for example.

In the embodiments shown in FIGS. 5*a* and 5*b*, the possibility of one or a plurality of absorbent cross threads 30 being provided in the woven fabric strip outside the connection zone 5 is moreover also illustrated in an exemplary manner. Said absorbent cross threads 30 are often woven into the woven fabric strip as weft threads directly during production.

The absorbent cross threads 30 can be welded to all or some of the longitudinal threads 2, preferably by way of the same welding method as the connection elements 5. Said absorbent cross threads 30 serve for preventing ladders in the woven fabric strip 1, for example. Should a defect arise in the region of the connection zone 5, said defect should not spread across the entire woven fabric strip. It is therefore advantageous for said absorbent cross threads 30 to be provided in the proximity of the connection zone, especially as first cross threads after the connection zone. Alternatively and/or additionally, welded threads can also be provided at, or woven into, respectively, other locations of the woven fabric strip.

Absorbent cross threads 30 of this type, when required, can be used in all embodiments of the invention, in particular also in the embodiments shown in FIG. 1*a/b*, 2*a/b*, 3*a/b*, or 4*a/b*.

A single absorbent cross thread 30 herein can be provided on each longitudinal end, as is shown in FIGS. 5*a/b*. However, a plurality of absorbent cross threads 30 can also be provided.

Figure 6A:
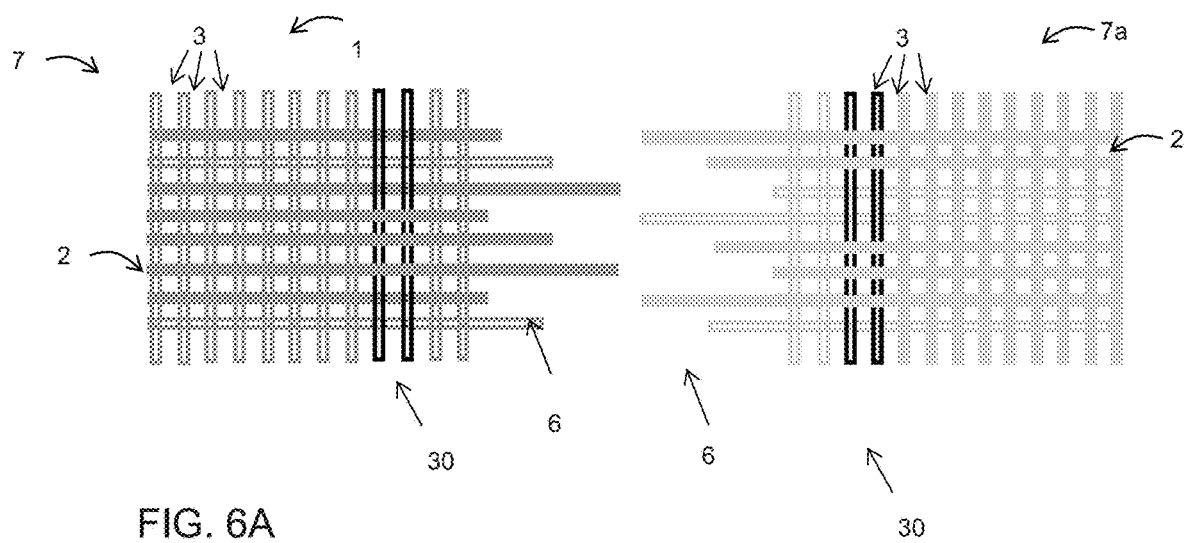
FIGS. 6a and 6b show the connection of two longitudinal ends according to one further aspect of the invention.
Figure 6B:
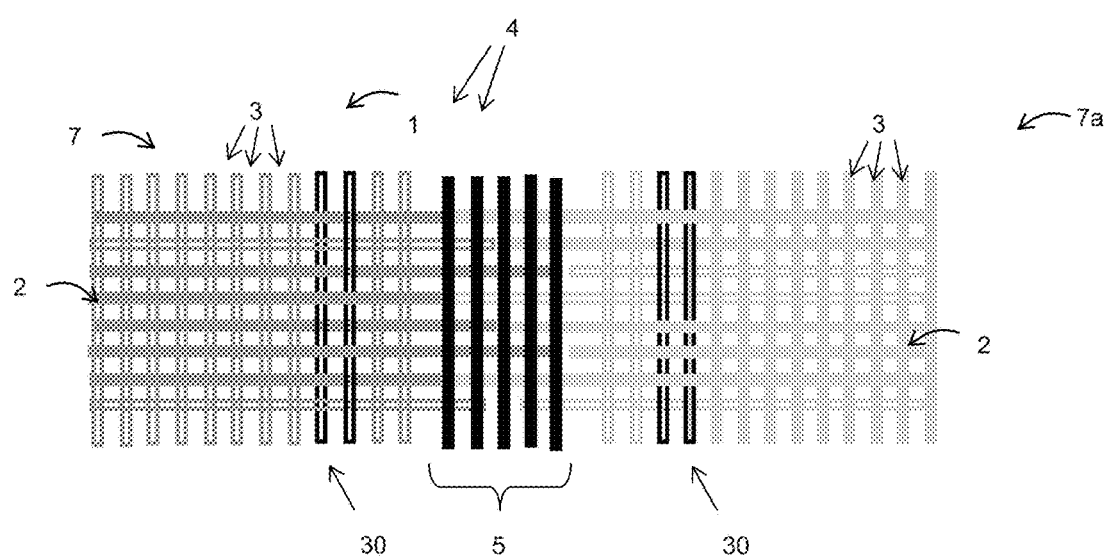

In FIGS. 6*a* and 6*b* it is illustrated in exemplary manner that the free ends 6 of each longitudinal end 7, 7*a* can have not only two but also more dissimilar lengths. An example having three dissimilar lengths is shown in these figures; however, four or more dissimilar lengths are also possible. The lengths in FIGS. 6*a/6b* are chosen such that the longitudinal thread density in the region of the connection zone 5 is the same, or largely the same, as outside the connection zone. This longitudinal thread density can however also be chosen so as to be larger or smaller by adapting the lengths of the free ends 6 in a corresponding manner.

Moreover, each longitudinal end 7, 7*a* in FIGS. 6*a/b* is embodied having absorbent cross threads 30. The latter are woven into the woven fabric strip and are welded to said woven fabric strip. The absorbent cross threads 30 do not have to be provided as first cross threads after the connection zone 5. Said absorbent cross threads 30 in this embodiment are in each case provided as the third and the fourth cross thread. However, other positionings are also possible.

Connection elements in the description of the following figures are referred to as interwoven. However, this is always intended to include the possibility of said connection elements also being stitched instead of woven.

The interwoven connection elements 4 will often be suitable threads. However, tapes or similar can also be used as interwoven connection elements 4.

Figure 7A:
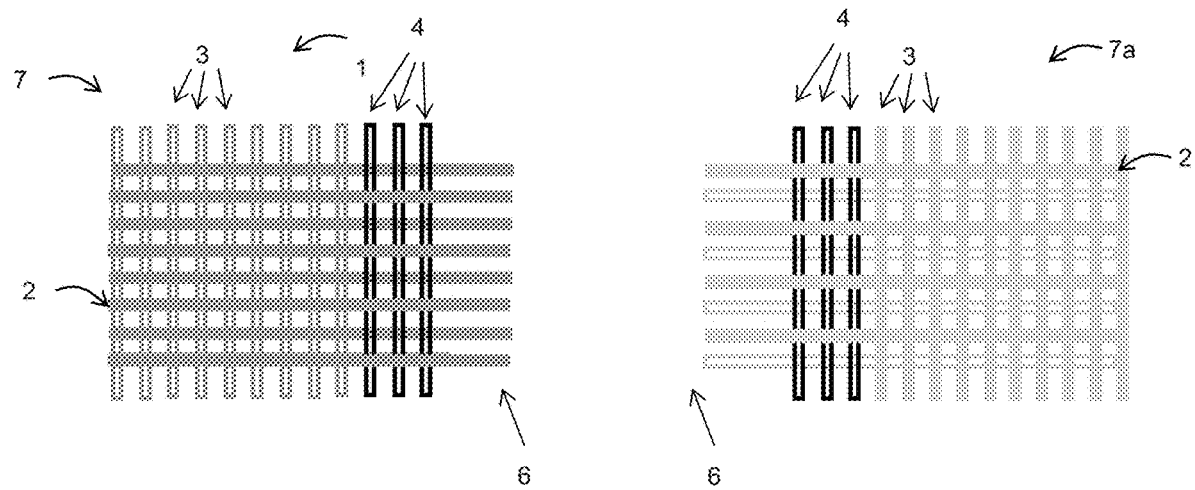
FIGS. 7a and 7b show the connection of two longitudinal ends according to one other aspect of the invention.

FIGS. 7*a/7b* show an embodiment of the invention in which the connection elements 4 are woven into the woven fabric strip.

FIG. 7*a* shows the two longitudinal ends 7, 7*a* of a woven fabric strip 1. The woven fabric strip 1 herein is formed from longitudinal threads 2 and cross threads 3. Some of the cross threads are embodied as connection elements 4. Said cross threads are embodied as absorbent threads which at least in part absorb the laser light used for the welding. Free ends 6 of the longitudinal threads 2 are provided at the two longitudinal ends 7, 7*a* by removing some cross threads 3. The length of said free ends in the embodiment shown in FIG. 7*a* comprises three cross threads. However, longer or shorter free ends 6 can also be provided. In the embodiment shown in FIG. 7*a*, the free ends 6 of the longitudinal threads 2 are of identical length on each longitudinal end 7, 7*a*.

In the embodiment according to FIG. 7*a*, connection elements 4 are interwoven on both longitudinal ends 7, 7*a*.

Figure 7B:
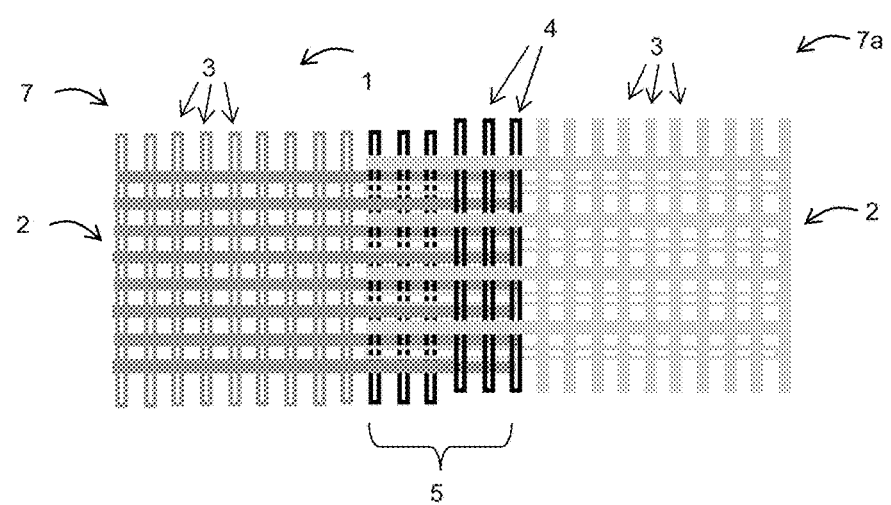

FIG. 7*b* now shows how said free ends 6 of the longitudinal threads 2 engage in one another in the region of the connection zone 5. The two longitudinal ends 7, 7*a* are positioned on top of one another such that the free ends 6 of the longitudinal threads 2 of one longitudinal end 7, 7*a* contact and are welded to at least some of the interwoven connection elements 4 of the other longitudinal end 7, 7*a*. It can also be provided herein that the connection elements 4 at the contact locations are also welded to the longitudinal threads with which said connection elements 4 are interwoven. This can be advantageous, is however not mandatory.

Figure 8A:
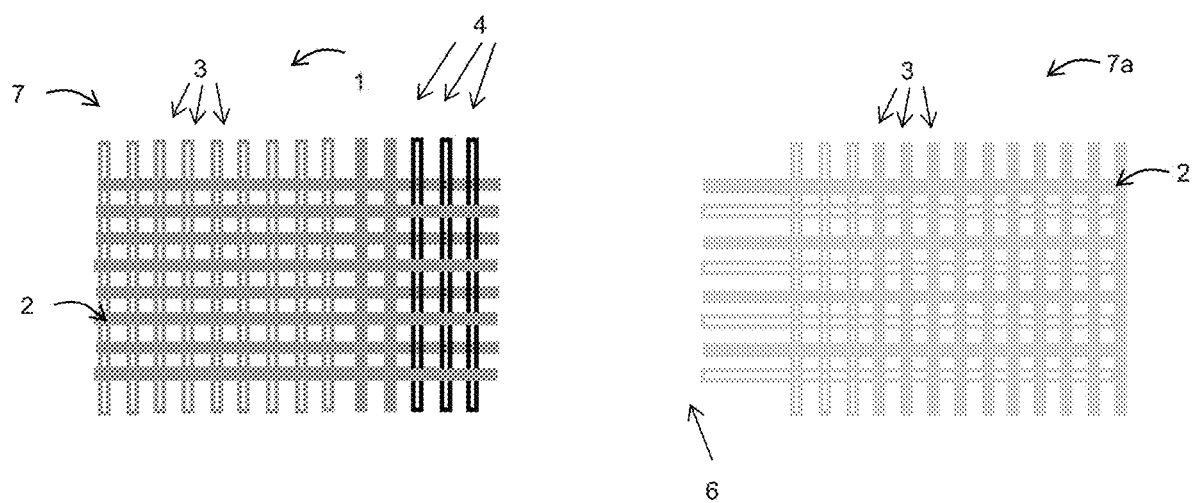
FIGS. 8a and 8b show the connection of two longitudinal ends according to one other aspect of the invention.

By contrast to FIG. 7*a/7b*, the embodiment shown in FIG. 8*a/8b* has interwoven connection elements 4 only on one longitudinal end 7. Free ends 6 of the longitudinal threads 2 do not inevitably have to be provided on said longitudinal end 7. By contrast, the other longitudinal end 7*a* has free ends 6 6 of the longitudinal threads 2 of the longitudinal threads.

Figure 8B:
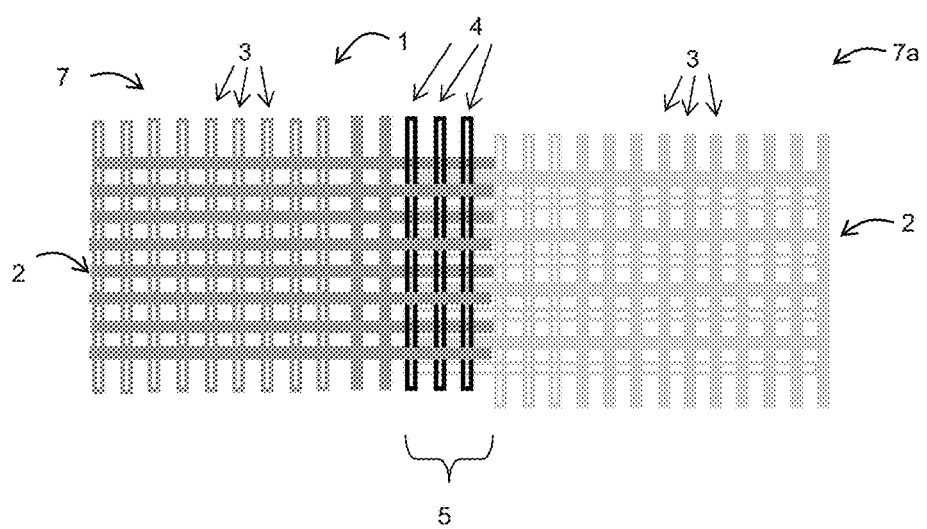

As is shown in FIG. 8*b*, the longitudinal ends 7, 7*a* are positioned on top of one another such that the free ends 6 of the longitudinal threads 2 of the one longitudinal end 7*a* contact and are welded to at least some of the interwoven connection elements 4 of the other longitudinal end 7. The width of the connection zone therefore corresponds approximately to the width of the region in which connection elements are woven into the one longitudinal end 7.

Figure 9A:
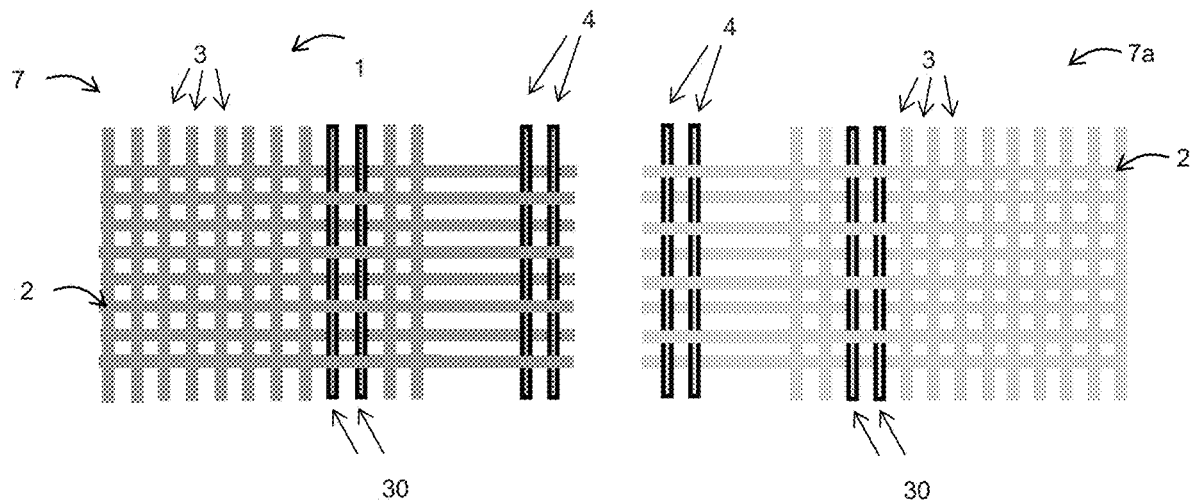
FIGS. 9a and 9b show the connection of two longitudinal ends according to one other aspect of the invention.
Figure 9B:
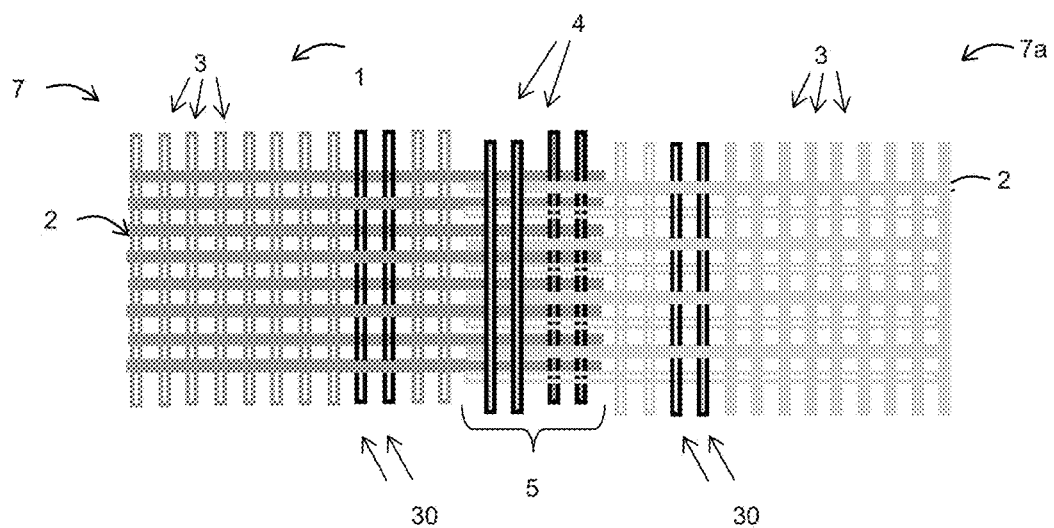

It is readily evident to the person skilled in the art that a multiplicity of variations are possible also in embodiments of the invention in which all or some of the connection elements 4 are woven into the woven fabric strip 1. FIGS. 9*a/9b* in an exemplary manner show one further such variation. Connection elements 4 which are in each case interwoven at the external end are provided on both longitudinal ends 7, 7*a*. Apart therefrom, some cross threads 3 have been removed. Cross threads are advantageously removed in a region which corresponds approximately to the width of the connection elements interwoven on the other longitudinal end 7, 7*a*.

The two longitudinal ends 7, 7*a* are disposed on top of one another such that the interwoven connection elements 4 of the one longitudinal end 7, 7a are positioned in the region in which cross threads 3 have been removed in the other longitudinal end 7, 7a. The two ends 7, 7a can again be connected to one another by transmission welding. Depending on the design embodiment or weave pattern of the woven fabric strip, it may be necessary in embodiments of the invention in which all or some of the connection elements 4 are woven into the woven fabric strip 1 that the connection is performed in two welding steps, once from above and once from below.

As is again obvious to the person skilled in the art, absorbent cross threads 30 can again be additionally provided outside the connection zone 5 even in the case of interwoven connection elements. Such absorbent cross threads 30 are shown in an exemplary manner in FIGS. 9a/9b. Such absorbent cross threads can however be provided in all embodiments of the invention.

Figure 10:
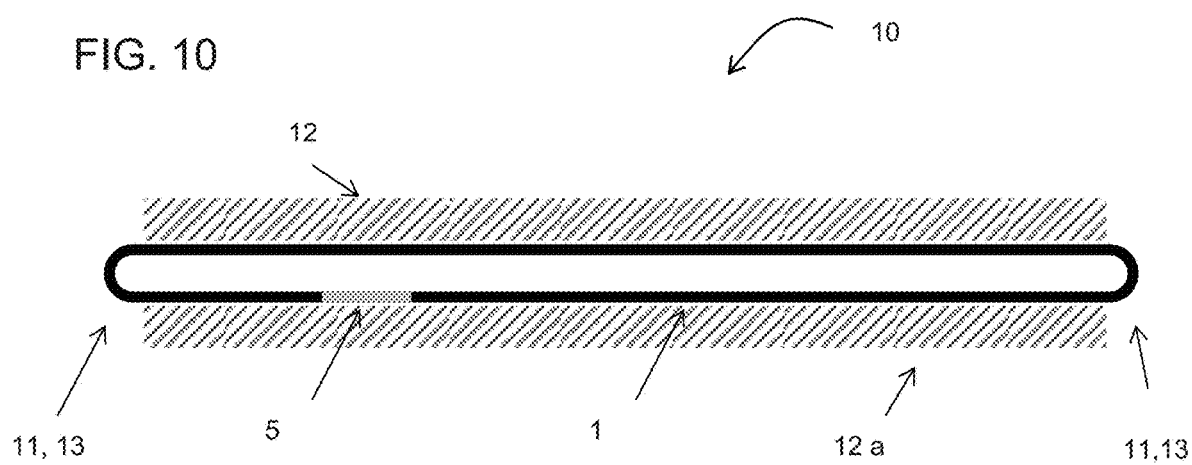
FIG. 10 shows a fabric clothing according to one aspect of the invention.

FIG. 10 schematically shows a fabric clothing 10, especially a seam felt 10, according to one aspect of the invention. The woven fabric strip 1 having the connection zone 5 is in the form of a continuous loop. A double-layered formation which has two fold locations 11 has been created by depositing the woven fabric loop on top of itself. The double-layered formation created from the woven fabric strip 1 rendered continuous serves as a base structure for the seam felt 10. As is shown in FIG. 10, said seam felt 10 can in each case be provided with one non-woven layer 12, 12a on the upper side and also on the lower side. Said non-woven layer 12, 12a is usually connected to the base structure by needle bonding. In advantageous embodiments of the invention, the strength of the connection zone 5 also after the needle bonding is at least 25%, in particular at least 50%, of the strength of the strength of the remaining woven fabric strip 1. As has been already described further above, it can be advantageous for the connection zone 5 to be disposed at some spacing from the fold locations 11. A spacing of at least 5 cm, or else 10 cm, is thus very advantageous. The connection zone 5 can preferably also be disposed approximately in the center between the two fold locations. The seam loops 13 will be formed from the two fold locations 11. To this end, some cross threads 3 are usually removed in the region of the fold locations 11. Said seam loops 13 are brought together. The fabric clothing 10 can be rendered continuous by being connected by means of a so-called pintle. The connection zone 5 in a seam felt of this type can be embodied according to any arbitrary embodiment of the invention. However, the connection zone 5 can be particularly advantageously embodied according to one of the variants shown in FIGS. 1a/b to 9a/b.

Figure 10A:
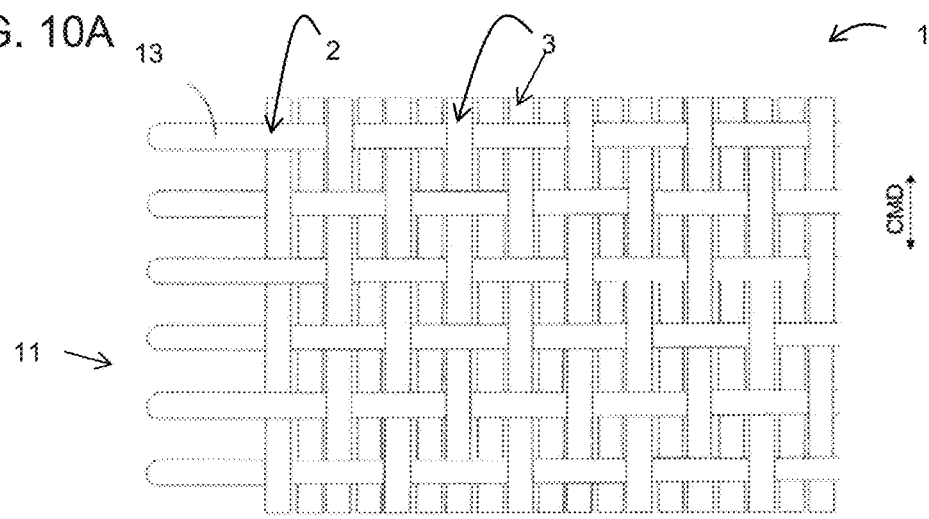
FIGS. 10a and 10b show potential embodiments of the seam loops according to one further aspect of the invention.
Figure 10B:
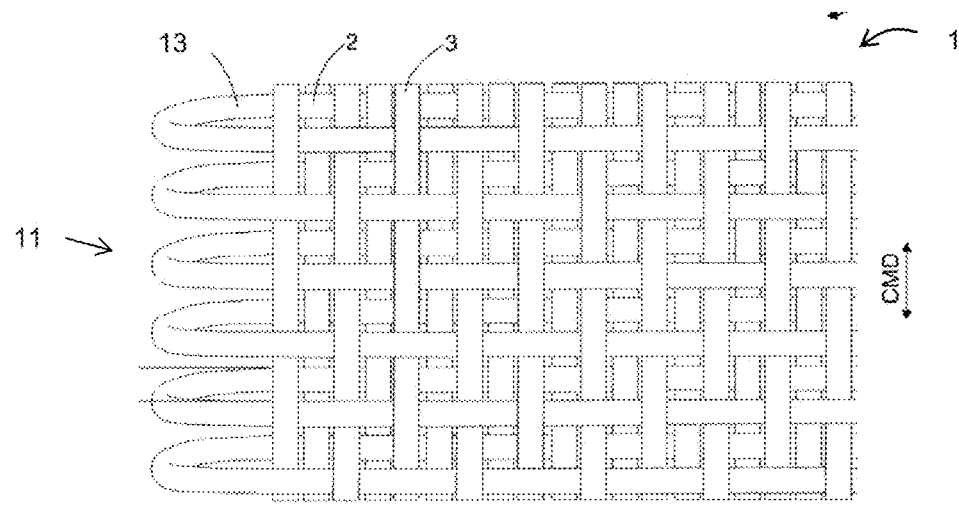

FIGS. 10a and 10b show a fragment about a fold location 11 in a fabric clothing 20 as is illustrated in FIG. 10. FIG. 10a shows a variant in which the longitudinal threads 2 are deposited directly on top of one another when folding. The seam loops 13 here thus stand so as to be vertical, that is to say so as to run in one plane with the thickness direction and the longitudinal direction of the fabric clothing 10.

In other embodiments, however, the seam loops 13 can also stand so as to be inclined and enclose an angle with said plane. Such an embodiment is shown in FIG. 10b. This can be implemented, for example, in that the longitudinal threads 2 are not deposited precisely on top of one another when folding.

Figure 11:
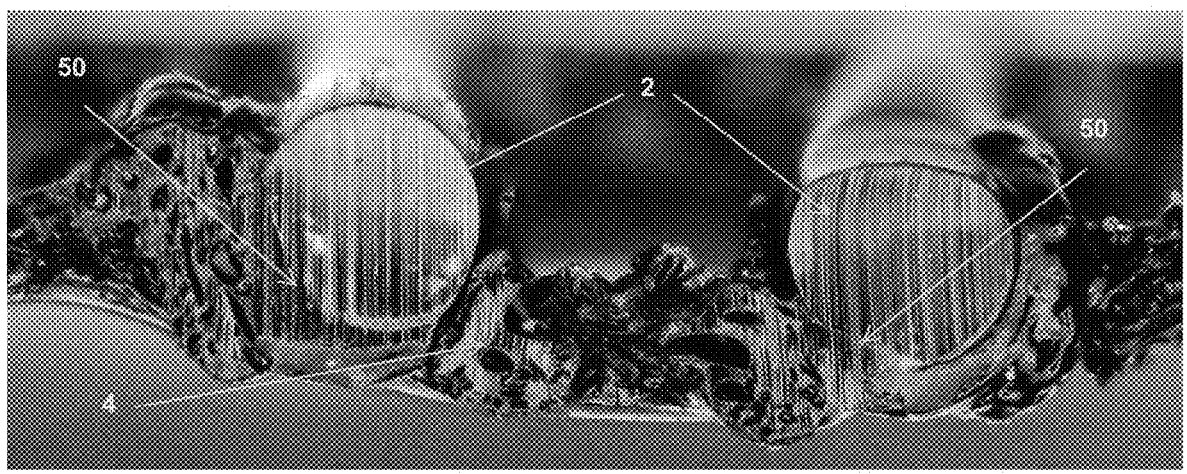
FIGS. 11 and 12 show exemplary welded connections according to one aspect of the invention.

FIG. 11 in a sectional view shows in an exemplary manner two longitudinal threads 2 which are connected to one another by a connection element 5. The two longitudinal threads 2 herein can emanate from the free ends 6 of two longitudinal ends 7, 7a, for example. The longitudinal threads are embodied as the transparent mating partner. The connection element 4 here is embodied as a thread. Said thread is the absorbent mating partner for the transmission welding. This can be implemented, for example, by adding carbon black, or any other suitable absorber material, to the polymer material of the thread. The connection element 4 is connected to the two longitudinal threads 2 at welded locations 50. The advantage of the transmission welding herein becomes very positively evident in FIG. 11. The connection element 4 can be deformed when welding. The thread 4 can partially melt on account of the heat created, for example. The shape of the connection element in this instance is also modified by the joining pressure usually applied. By contrast, the longitudinal threads 2 are largely preserved in terms of the structure thereof. In particular, the tensile strength of the longitudinal threads 2 is also not changed, or only slightly changed, on account thereof.

Figure 12:
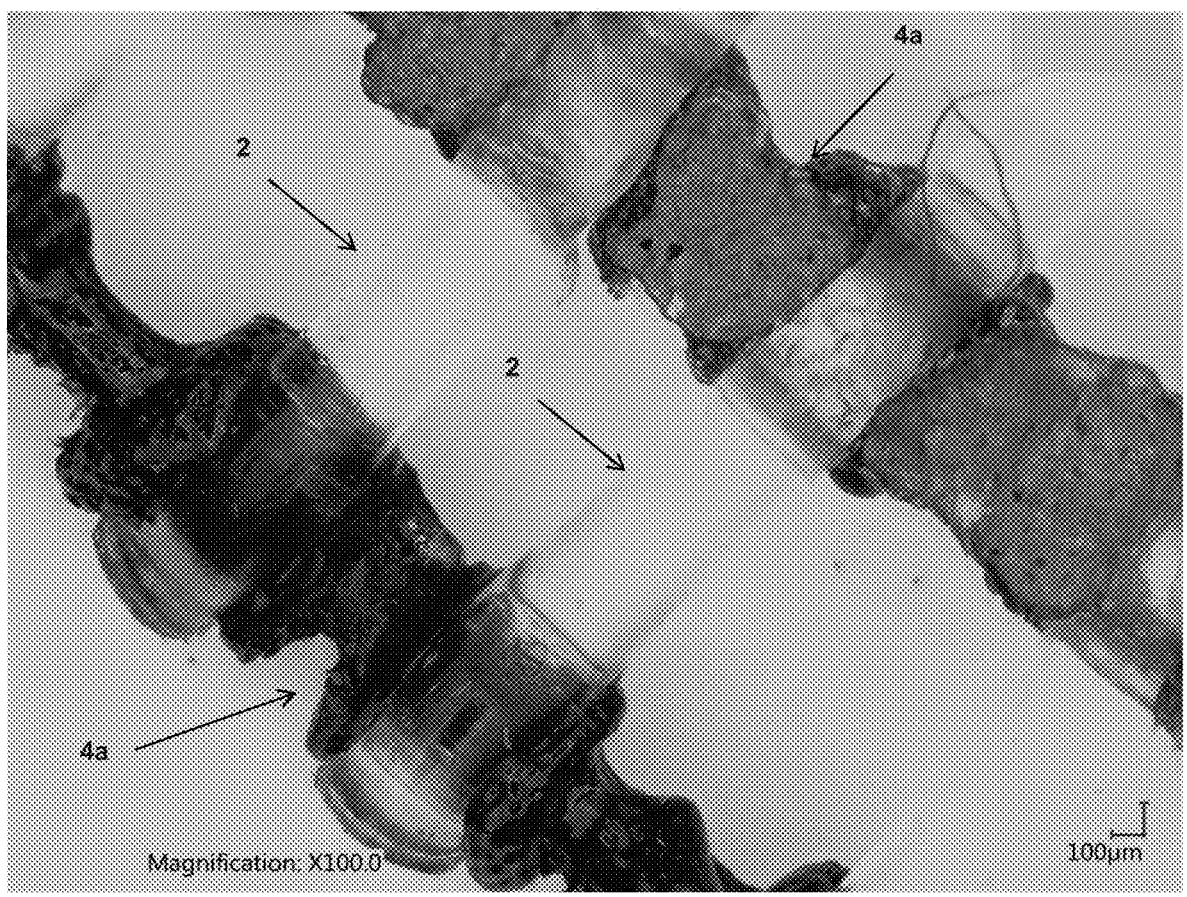

Part of a connection zone 5 is shown in the plan view in FIG. 12. Transparent longitudinal threads 2 are again illustrated. Said longitudinal threads 2 are connected to one another by means of two connection elements 4a, 4b. The connection elements 4a, 4b are embodied as two threads which run substantially in the cross direction and are welded to the longitudinal threads by means of transmission welding, here especially by means of laser transmission welding. The one connection element 4a herein is dyed by means of carbon black, while the other connection element 4b is dyed by means of graphite so as to render the latter absorbent to the laser light used. Both connection elements 4a, 4b are disposed below the longitudinal threads 2 here. The welding procedure for both connection elements 4a, 4b can thus be performed from the same side here. In the example shown in FIG. 12, laser light, which was in a wavelength region between 780 nm and 1100 nm, was emitted from above. Said laser light penetrated the longitudinal threads 2 which were embodied so as to be transparent to said light, and was absorbed by the connection elements 4a, 4b which were heated on account thereof.

Figure 13A:
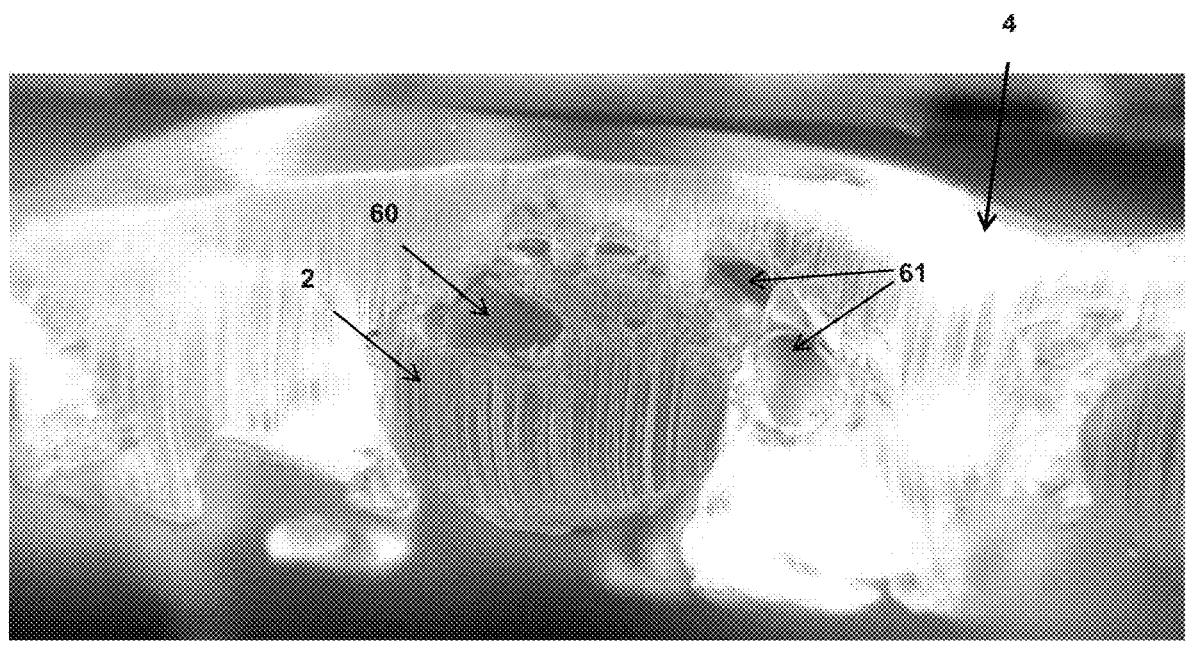
FIGS. 13a and 13b show a welded connection which has been produced by means of ultrasonic welding.
Figure 13B:
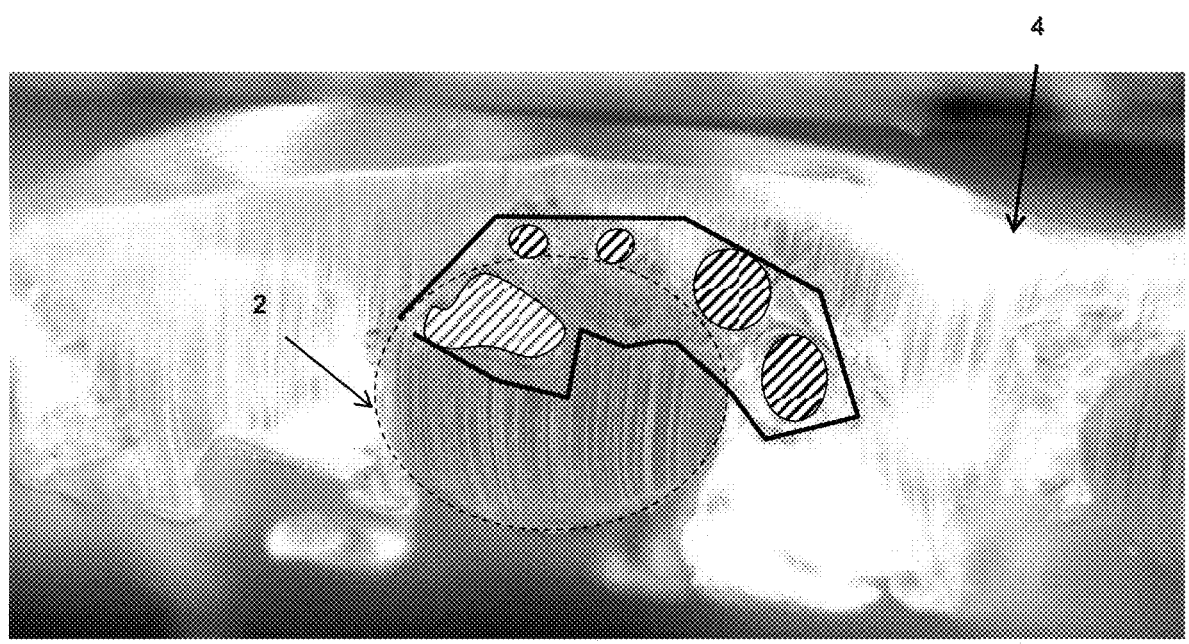

In order to highlight the differences in comparison to the prior art as well as advantages of the invention, a longitudinal thread 2 which by means of ultrasonic welding has been welded to a connection element 4 is shown in FIGS. 13a and 13b. It can be clearly seen herein that bubbles 60, 61 which weaken the material and the connection are created on account of the welding. The connection element as well as the longitudinal thread 60 herein both have bubbles 61. By contrast to a connection according to an aspect of the invention, the longitudinal thread 2 is also structurally modified and thus weakened on account thereof. FIG. 13b corresponds to FIG. 13a, but for improved clarity the zone having the material structure (bold black line) modified on account of the welding and the bubbles 60, 61 situated therein have been graphically highlighted. A modification of the material structure of the connection element 4 as well as of the longitudinal thread 2 which can clearly be seen is caused by the energy introduced when welding. FIGS. 13a and 13b thus not only show one of the advantages of the invention. A comparison between FIGS. 11 and 13a/b also highlights that connections produced by means of transmission welding can also be very well differentiated from other welded connections, even in the finished fabric clothing. As is shown in the figures, this verification can take place in a very simple manner by means of viewing the connections under a light microscope. In the context of a further inventive idea it is to be pointed out that the design possibilities of the connection zone described in the course of this application thus far, in particular but not exclusively the designs shown in FIGS. 1*a/b* to 9*a/b*, can also be used with certain advantages in combination with joining methods other than transmission welding, in particular with ultrasonic welding or further variants of laser welding. Potential embodiments are described in the following sentences which do not represent claims:

Sentence 1: A fabric clothing, in particular a press felt, for use in a machine for producing a fibrous web, comprising a woven fabric strip having interwoven longitudinal threads and cross threads, as well as having a first and a second longitudinal end, wherein the two longitudinal ends of the woven fabric strip are connected to one another in a connection zone by welding, in particular ultrasonic welding and/or laser welding, wherein at least one connection element which is connected to at least some of the longitudinal threads of at least one longitudinal end, in particular both longitudinal ends, by means of transmission welding, in particular by means of laser transmission welding, is provided.

Sentence 2: A fabric clothing as claimed in sentence 1, characterized in that the connection zone is configured in such a manner that one or a plurality of cross threads, while configuring free ends of the longitudinal threads, are removed on at least one longitudinal end, in particular both longitudinal ends, of the woven fabric strip, and at least one connection element which is welded to at least some of the free ends of both longitudinal ends by means of transmission welding, in particular by means of welding, in particular ultrasonic welding and/or laser welding, is provided, and in that the force transmission between the two longitudinal ends takes place only by way of the connection element, or connection elements, respectively.

Sentence 3: A fabric clothing according to one of sentences 1 or 3, characterized in that the at least one connection element comprises or is composed of at least one thread or a tape, which is oriented substantially in the cross direction of the woven fabric tape.

Sentence 4: A fabric clothing as claimed in one of sentences 1 to 3, characterized in that more than one connection element, in particular two, three, or more, connection elements, are provided.

Sentence 5: A fabric clothing as claimed in sentence 4, characterized in that connection elements are disposed on an upper side as well as on a lower side of the connection zone, or in that all connection elements are disposed on one side of the connection zone.

Sentence 6: A fabric clothing as claimed in one of sentences 2 to 5, characterized in that the free ends of the longitudinal threads engage in one another in the region of the connection zone.

Sentence 7: A fabric clothing as claimed in one of sentences 2 to 6, characterized in that the free ends of the longitudinal threads of one longitudinal end or both longitudinal ends are of dissimilar lengths. In this way, the density of the longitudinal threads in the connection zone can be reduced, and a simple connection of the longitudinal ends can nevertheless still be achieved.

Sentence 8: A fabric clothing as claimed in one of the preceding sentences, characterized in that one or a plurality of securing cross threads which are welded to at least some of the longitudinal threads are woven into the woven fabric strip. The securing cross threads can be welded to all or some of the longitudinal threads, preferably by the same welding method as the connection elements. Said securing cross threads serve for preventing ladders in the woven fabric strip, for example.

Sentence 9: A fabric clothing as claimed in one of sentences 1 to 8, characterized in that at least one connection element contacts or is welded to only part of the longitudinal threads, in particular to fewer than 75%, or fewer than 50%, of the longitudinal threads of each longitudinal end.

Sentence 10: A fabric clothing as claimed in one of sentences 1 to 9, characterized in that the connection element at least on the surface thereof comprises a material which absorbs light from a wavelength range between 780 nm and 1100 nm, in particular between 800 nm and 1000 nm.

Sentence 11: A fabric clothing as claimed in one of the preceding sentences, characterized in that the connection zone has a permeability and/or thickness which differs from the permeability of the remaining woven fabric strip by less than 30%.

Sentence 12: A fabric clothing as claimed in one of the preceding sentences, characterized in that the connection zone has a permeability and/or thickness which differs from the permeability of the remaining woven fabric strip by more than 30%.

The most varied types of woven fabrics can be used as a woven fabric strip. It can be provided that the strip loop, which is created by rendering the woven fabric strip continuous, is fitted to the machine directly and used as a strip loop, optionally after needle bonding to one or a plurality of non-woven layers, or after applying other suitable functional layers, respectively. In such an embodiment, the connection zone represents a type of seam of the fabric clothing.

Alternatively, it can be provided that the strip loop is used in a seam felt, as has been described above, for example.

The invention claimed is:

1. A fabric clothing for use in a machine for producing a fibrous web, the fabric clothing comprising:
    a woven fabric strip having two longitudinal ends including a first longitudinal end and a second longitudinal end and interwoven longitudinal threads and cross threads, wherein said two longitudinal ends being connected to one another in a connection zone, wherein said two longitudinal ends are welded to one another by means of transmission welding; and
    at least one connection element which by means of the transmission welding is connected to at least some of said longitudinal threads of both of said longitudinal ends, said at least one connection element is connected to said woven fabric strip only by way of a welded connection, said at least one connection element having a surface formed of a material that absorbs light;
    said at least one connection element located on only one side of said woven fabric strip.

2. The fabric clothing according to claim 1, wherein said connection zone is configured in such a manner that at least one of said cross threads, while configuring free ends of said longitudinal threads, are removed on at least one of said longitudinal ends of said woven fabric strip, and said at least one connection element which by means of the transmission welding is welded to at least some of said free ends of both of said longitudinal ends, and in that a force transmission between said two longitudinal ends takes place only by way of said at least one connection element.

3. The fabric clothing according to claim 2, wherein all of said free ends of both of said longitudinal ends contact one another in a region of said connection zone.

4. The fabric clothing according to claim 2, wherein said free ends of said longitudinal threads of one or both said longitudinal ends are of dissimilar lengths.

5. The fabric clothing according to claim 1, wherein said at least one connection element is composed of at least one thread or a tape which is oriented substantially in a cross direction of said woven fabric strip.

6. The fabric clothing according to claim 1, wherein said at least one connection element is at least two connection elements, three connection elements, or more than three connection elements.

7. The fabric clothing according to claim 6, wherein said connection elements are disposed on an upper side as well as on a lower side of said connection zone, or in that all of said connection elements are disposed on one side of said connection zone.

8. The fabric clothing according to claim 1, wherein said cross threads include absorbent cross threads and at least one of said absorbent cross threads which are welded to at least some of said longitudinal threads are woven into said woven fabric strip.

9. The fabric clothing according to claim 1, wherein said at least one connection element contacts or is welded to only part of said longitudinal threads of each of said of longitudinal ends.

10. The fabric clothing according to claim 1, wherein said material of said surface of said at least one connection element absorbs light that has a wavelength between 780 nm and 1100 nm.

11. The fabric clothing according to claim 1, wherein said connection zone has a permeability which differs from a permeability of a remaining part of said woven fabric strip by less than 30%.

12. The fabric clothing according to claim 1, wherein:

the fabric clothing is a press felt; and the transmission welding is a laser transmission welding.

13. The fabric clothing according to claim 1, wherein said connection zone is configured in such a manner that at least one of said cross threads, while configuring free ends of said longitudinal threads, are removed on both of said longitudinal ends of said woven fabric strip, and said at least one connection element which by means of the transmission welding is welded to at least some of said free ends of both of said longitudinal ends, and in that a force transmission between said two longitudinal ends takes place only by way of said at least one connection element.

14. The fabric clothing according to claim 1, wherein said at least one connection element contacts or is welded to fewer than 75% of said longitudinal threads of each of said longitudinal ends.

15. The fabric clothing according to claim 1, wherein said at least one connection element contacts or is welded to fewer than 50% of said longitudinal threads of each of said longitudinal ends.

16. The fabric clothing according to claim 1, wherein said connection element has a surface formed of a material which absorbs light from a wavelength range between 800 nm and 1000 nm.

* * * * *